United States Patent [19]

Maynard

[11] Patent Number: 4,747,262
[45] Date of Patent: May 31, 1988

[54] COMPRESSOR POWER UNIT FUEL FLOW CONTROL

[75] Inventor: Frederick C. Maynard, Phoenix, Ariz.

[73] Assignee: Allied-Signal, Inc., Morris Township, Morris County, N.J.

[21] Appl. No.: 945,940

[22] Filed: Dec. 22, 1986

Related U.S. Application Data

[62] Division of Ser. No. 784,400, Oct. 4, 1985, Pat. No. 4,682,469.

[51] Int. Cl.[4] .............................. F02C 9/52; F02C 9/48
[52] U.S. Cl. .................................... 60/34.23; 60/39.27
[58] Field of Search ................... 60/39.03, 39.06, 39.27, 60/39.281, 39.29, 734, 740, 741, 39.23; 431/12, 19

[56] References Cited

U.S. PATENT DOCUMENTS

| | | | |
|---|---|---|---|
| 3,037,348 | 6/1962 | Gassmann | 60/39.29 |
| 3,224,195 | 12/1965 | Walsh | 60/740 |
| 3,707,074 | 12/1972 | Meyer et al. | 60/740 |
| 3,910,035 | 10/1975 | Juhasz et al. | 60/39.29 |
| 4,149,371 | 4/1979 | Spraker et al. | 60/39.29 |
| 4,470,798 | 9/1984 | Graat et al. | 431/9 |

Primary Examiner—Louis J. Casaregola
Attorney, Agent, or Firm—James W. McFarland; J. Richard Konnecker

[57] ABSTRACT

In a gas turbine engine compressor power unit fuel is supplied at an essentially constant pressure to a fuel nozzle for injection into the combustion liner of the power unit's combustor. Nozzle fuel flow is modulated solely by bleeding off combustor supply air to vary the internal liner pressure, thereby altering the fuel pressure drop across the nozzle.

8 Claims, 1 Drawing Sheet

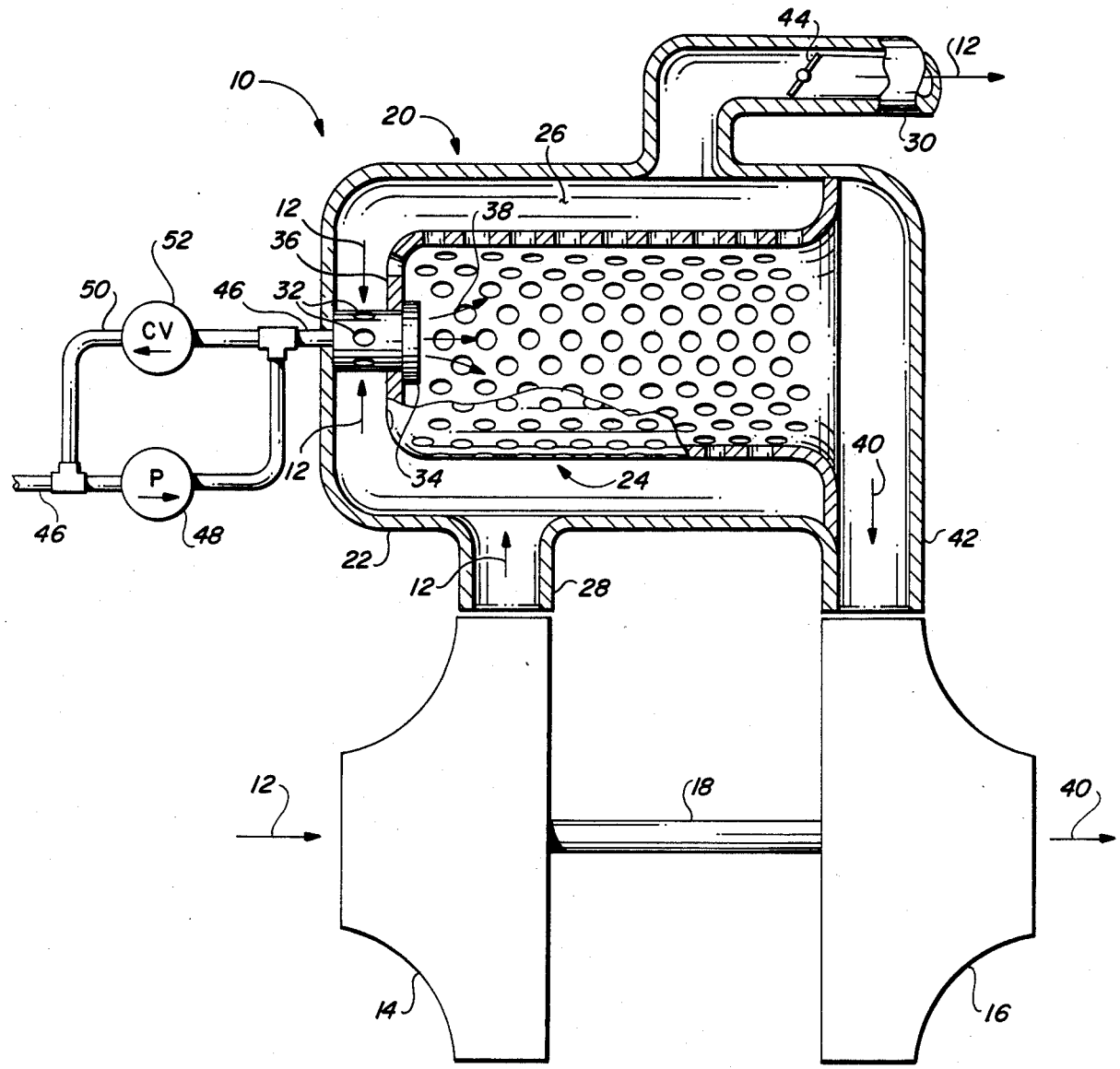

COMPRESSOR POWER UNIT FUEL FLOW CONTROL

This is a division of application Ser. No. 784,400 filed Oct. 4, 1985 (U.S. Pat. No. 4,682,469).

BACKGROUND OF THE INVENTION

The present invention relates generally to gas turbine engines, and more particularly provides a uniquely simple fuel flow control system for a turbine engine compressor power unit.

Gas turbine engines are often utilized as compressor power units—i.e., to supply compressed air to a pneumatically-driven system or the like as opposed to providing shaft or propulsive power. Conventionally, the fuel flow through a compressor power unit's relatively high pressure fuel nozzle is controlled by varying the nozzle's fuel inlet pressure in response to sensed variations in a variety of operating parameters of the unit. This fuel flow control method typically results in relatively complex and expensive fuel control system apparatus.

Accordingly, it is an object of the present invention to provide a substantially simpler and less expensive fuel flow control system for a turbine engine compressor power unit.

SUMMARY OF THE INVENTION

The present invention provides a gas turbine engine compressor power unit which has an inexpensive and greatly simplified fuel flow control system. A relatively low pressure fuel nozzle, such as an air blast nozzle, is used to inject fuel into the unit's combustor liner. Fuel is supplied to the nozzle at an essentially constant pressure, and means are provided for bleeding off a selectively variable quantity of compressor discharge air for supply to a pneumatically-operated system or the like.

Variance in the bleed air flow rate is allowed to concomitantly vary the pressure within the combustor liner which, in turn, alters the fuel pressure drop across the nozzle without appreciably changing the nozzle fuel supply pressure. This pressure drop variance automatically modulates fuel flow through the nozzle without the necessity of any direct control feedback to the fuel supply system, thereby substantially reducing the cost and complexity thereof.

According to a feature of the invention, the effectiveness of the aforementioned fuel flow control method is maximized by correlating the various components of the compressor power unit to maintain the absolute pressure ratio between the fuel nozzle inlet pressure and the internal liner pressure within a predetermined range as the bleed air flow is varied between its minimum and maximum value.

BRIEF DESCRIPTION OF THE DRAWING

The single drawing FIGURE is a partially schematic, partially cross-sectional illustration of a turbine engine compressor power unit embodying fuel flow control principles of the present invention.

DETAILED DESCRIPTION

Illustrated in the drawing is a gas turbine engine compressor power unit 10 which embodies principles of the present invention and is utilized to supply a flow of compressed ambient air 12 to an air-utilizing apparatus or system (not shown). Unit 10 comprises a compressor 14, a turbine 16 rotationally coupled to the compressor by a shaft 18, and a combustor 20 having an outer housing 22 and a perforated combustion liner 24 positioned within the housing. Circumscribing the liner 24 within housing 22 is an inlet plenum 26 which opens outwardly through a housing inlet 28 and a bleed air duct 30 used to flow the compressed air 12 to its end apparatus or system in a manner subsequently described.

During operation of the compressor power unit 10, ambient air 12 is drawn into the compressor 14, compressed, and flowed into the inlet plenum 26 through the housing inlet 28. A portion of the compressed air 12 entering the inlet plenum 26 is forced into the air inlets 32 of a relatively low pressure air blast fuel injection nozzle 34, of conventional construction, which extends inwardly through a left end wall 36 of the combustion liner 24. As used herein with reference to the nozzle 34, the term "relatively low pressure" means a fuel inlet supply pressure no greater than approximately 130 percent of the internal liner pressure during operation of the unit 10.

A further portion of the compressed air 12 entering the inlet plenum is forced into the liner 24 through its perforations. In a manner to be described, fuel from a source thereof (not shown) is supplied to the nozzle 34 and mixed with the compressed air entering its inlets 32 to form a fuel-air mixture 38 which is injected into the interior of the combustion liner 24. In a conventional manner, the fuel-air mixture 38 and the compressed air 12 entering the liner interior are burned to form a hot, expanded gas 40 that is expelled from the combustor 20, through a housing outlet 42, into and through the turbine 16. Passage through the turbine 16 of the hot, expanded exhaust gas 40 rotationally drives the turbine and, via the shaft 18, the compressor 14. To bleed off a selectively variable quantity of compressor discharge air 12 entering the combustor inlet plenum 26, a valve 44 is operatively positioned in the bleed air duct 30. Valve 44 may be manually operated, or may be automatically modulated by a suitable control system associated with the air-utilizing end system or apparatus to which the bleed air 12 is flowed through the duct 30.

The present invention provides a uniquely simple method of controlling the nozzle fuel flow rate which will now be described. Fuel is supplied to the nozzle 34 from a source thereof through a conduit 46 by means of a fuel pump 48 operatively installed therein. The pump 48 may be of any suitable construction, and may be either gear or electrically driven.

Importantly, and quite unlike conventional fuel delivery systems, the fuel delivered to the nozzle 34 is supplied thereto at an essentially constant pressure. Maintenance of this essentially constant fuel supply pressure is achieved by means of a fuel bypass conduit 50 connected at its opposite ends to the supply conduit 46 upstream and downstream of the pump 48, and having installed therein pressure regulating means in the form of a spring-loaded check valve 52 set to maintain the predetermined constant fuel supply pressure to the nozzle 34.

The fuel flow rate through the nozzle 34 is controlled not by in any manner altering the pressure of fuel supplied to the nozzle through conduit 46, but solely by varying the fuel pressure drop across the nozzle. Such pressure drop variation is achieved by utilizing the valve 44 to modulate the flow of bleed air 12 through the bleed air supply duct 30. Changes in the bleed air supply flow rate concomitantly vary the pressure within the combustion liner 24 which, in turn, varies the fuel pressure drop across the nozzle and the fuel flow rate therethrough.

It is important to note that modulation of the bleed air flow rate automatically varies the nozzle fuel flow rate—there is no direct control system feedback to the nozzle fuel supply system. As a significant side benefit of this greatly simplified fuel flow control system, the pressure of the bleed air 12 supplied through the duct 30 is also automatically maintained at an essentially constant pressure level during operation of the compressor power unit 10.

In developing the present invention, it has been found that the effectiveness of the aforementioned novel fuel flow rate control system is maximized by correlating the configural and operating characteristics of the compressor 14, the combustor 20 and the bleed air duct 30 in a manner maintaining the absolute pressure ratio between the fuel inlet supply pressure and the internal pressure of the combustion liner 24 within a predetermined range. Specifically, it has been found that it is preferable to maintain such absolute pressure ratio within the range of about 1.1 to about 1.5—the approximate end points of such range generally corresponding to the variation in bleed air supply flow rate from a minimum value to a maximum value.

As a specific example of the maintenance of this absolute pressure ratio range, in the illustrated embodiment of the present invention, with the valve 44 in its fully closed position, the fuel supply pressure to the nozzle 34 is approximately 44 psia, and the internal liner pressure is approximately 39.0 psia, so that the fuel supply-to-liner absolute pressure ratio is approximately 1.13. At full load condition, with the valve 44 in a fully open position, the liner internal pressure is reduced to approximately 34.0 psia, changing the fuel supply-to-liner absolute pressure ratio to approximately 1.3.

It is also desirable in the illustrated embodiment of the present invention to maintain the fuel flow variation (corresponding to bleed air flow variation between no load and full load condition) within the range of from about twenty five to fifty percent. In the illustrated example, variation of the liner internal pressure between approximately 39.0 psia and 34.0 psia increases the nozzle's fuel flow rate from approximately 30 lb/min to approximately 42.4 lb/min—a flow rate variation of slightly more than 40 percent.

The foregoing detailed description is to be clearly understood as given by way of illustration and example only, the spirit and scope of this invention being limited solely by the appended claims.

What is claimed is:

1. Apparatus for supplying fuel to a combustor having a perforated combustion liner circumscribed by an inlet plenum adapted to receive pressurized air from a source thereof, said apparatus comprising:
   (a) nozzle means for receiving pressurized fuel from a source thereof and injecting the received fuel into the liner;
   (b) means for supplying fuel to said nozzle means at an essentially constant pressure;
   (c) means for varying the fuel pressure drop across said nozzle means, to thereby modulate the fuel flow therethrough without appreciably altering the pressure of fuel supplied to said nozzle means; and
   (d) means for maintaining the absolute pressure ratio between the pressure of fuel supplied to said nozzle means and the pressure within the liner within a range between about 1.1 and about 1.3.

2. Apparatus for supplying fuel to a combustor having a perforated combustion liner circumscribed by an inlet plenum adapted to receive pressurized air discharged from a compressor, said apparatus comprising:
   (a) nozzle means for receiving pressurized fuel from a source thereof and injecting the received fuel into the liner;
   (b) means for supplying fuel to said nozzle means at an essentially constant pressure; and
   (c) means for varying the fuel pressure drop across said nozzle means, to thereby modulate the fuel flow therethrough without appreciably altering the pressure of fuel supplied to said nozzle means;
   said varying means (c) comprising means for selectively varying the pressure within the liner, including means for bleeding off a selectively variable quantity of air discharged from the compressor.

3. The apparatus of claim 3 wherein said last-mentioned means include a bleed air duct communicating with said combustion liner, and valve means for modulating flow through said bleed air duct.

4. A gas turbine engine compressor power unit comprising:
   (a) rotationally drivable compressor means for receiving, compressing and discharging a flow of air;
   (b) rotationally drivable turbine means rotationally coupled to said compressor means;
   (c) combustor means for receiving fuel and pressurized air, mixing and burning the received fuel and air, and discharging hot, expanding gas through said turbine means to rotationally drive the same, said combustor means having a perforated liner circumscribed by an inlet plenum communicating with said compressor to receive compressed air discharged therefrom;
   (d) nozzle means for receiving pressurized fuel from a source thereof and injecting the fuel into said liner;
   (e) means for supplying fuel to said nozzle means at an essentially constant pressure; and
   (f) means for bleeding off a selectively variable quantity of compressor discharge air to thereby modulate the flow of fuel through said nozzle means solely by causing a pressure variation within said liner.

5. The compressor power unit of claim 4 further comprising means for maintaining the absolute pressure ratio between said essentially constant fuel supply pressure and the pressure within said liner within a range of from about 1.1. to about 1.3.

6. The compressor power unit of claim 5 wherein said nozzle means comprise a relatively low pressure fuel injection nozzle.

7. The compressor power unit of claim 6 wherein said nozzle is an air blast fuel nozzle.

8. The compressor power unit of claim 4 wherein said bleeding off means (f) comprise a bleed air duct communicating with said inlet plenum, and valve means for selectively varying flow through said bleed air duct.

* * * * *